US012348616B2

(12) United States Patent
Buckris et al.

(10) Patent No.: US 12,348,616 B2
(45) Date of Patent: *Jul. 1, 2025

(54) SYSTEM AND METHOD FOR DEVICE-SPECIFIC CRYPTOGRAPHIC KEY

(71) Applicants: Ruben Buckris, Brooklyn, NY (US); Linda Buckris, Brooklyn, NY (US)

(72) Inventors: Ruben Buckris, Brooklyn, NY (US); Linda Buckris, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/978,819

(22) Filed: Dec. 12, 2024

(65) Prior Publication Data

US 2025/0112765 A1 Apr. 3, 2025

Related U.S. Application Data

(63) Continuation-in-part of application No. 18/060,547, filed on Nov. 30, 2022, now Pat. No. 12,197,548.

(51) Int. Cl.
*G06F 21/12* (2013.01)
*G06F 21/10* (2013.01)
*H04L 9/08* (2006.01)
*H04L 9/32* (2006.01)

(52) U.S. Cl.
CPC .......... *H04L 9/0827* (2013.01); *H04L 9/0866* (2013.01)

(58) Field of Classification Search
CPC . G06F 21/12; G06F 21/10; H04L 9/32; H04L 9/0827; H04L 9/0866
See application file for complete search history.

(56) References Cited

U.S. PATENT DOCUMENTS 8,914,908 B2 * 12/2014 Katkar .................... G06F 21/10
 713/193
11,263,848 B2 * 3/2022 Suleiman ............... H04L 63/108
2014/0282897 A1 * 9/2014 Stuntebeck .......... G06F 21/6218
 726/4
2018/0144109 A1 * 5/2018 Kamakura ............ G06F 21/121
2020/0136827 A1 * 4/2020 Hopkins ............... H04L 9/3231

FOREIGN PATENT DOCUMENTS

CN 107241317 B * 1/2021 ......... H04L 63/0861

* cited by examiner

*Primary Examiner* — Jayesh M Jhaveri

(57) ABSTRACT

A system and method for securely obtaining access to a program operating on a remote device via a local smart pass program transmitting a local cryptographic key specific to a local user device.

20 Claims, 15 Drawing Sheets

SYSTEM AND METHOD FOR DEVICE-SPECIFIC CRYPTOGRAPHIC KEY

PRIORITY

This continuation-in-part non-provisional application claims priority to and the benefit of U.S. non-provisional application Ser. No. 18/060,547, filed Nov. 30, 2022, which is incorporated herein as if restated in full.

SUMMARY

The system may comprise a computing device, such as a smart phone, tablet, laptop, or desktop computer, a primary program, such as a software application, a browser, a website, and/or an online platform, a network, an external processor, and a cryptographic key program. In one embodiment, the computing device is configured to access the program over a network, with the primary program configured to receive data and instructions from the external processor. In another embodiment, the primary program is stored, installed, and run on the computing device, and the program is configured to send and receive data between the computing device and the external processor via the network. In yet another embodiment, the primary program is configured to be stored, installed, and run on the external processor, but is configured to send and receive data between the external processor and the computing device via the network. In all of these embodiments, the cryptographic key program is stored, installed, and run on the computing device.

In one embodiment, the cryptographic key is configured to enable a user to access a plurality of primary programs via a computing device on which the cryptographic key is stored, installed, and run. In another embodiment, a separate cryptographic key is dedicated to each separate primary program. Thus, a local cryptographic key is dedicated to a first primary program, a remote cryptographic key is dedicated to a second primary program, etc.

The cryptographic key may be configured to recognize the device on which it is initially stored and installed. The cryptographic key is configured to run, and only run, on this same device and no other devices. Recognition of the device and distinguishing that device from all other devices may occur by detecting, remembering, and verifying a plurality of factors. Those factors may include and be a combination of: a user account associated with the device, a phone number associated with the device, a SIM card associated with the device, a WiFi network or Bluetooth connection, the time at which the primary program was downloaded or modified in a particular way, the time at which the cryptographic key (or cryptographic keychain, as will be described) was created, the operating system of the device, a unique unit code associated with the device to distinguish it from other units of the device, various types of data stored on the device, and an encrypted dataset created by or forming the cryptographic key and installed on the device.

The encrypted dataset may be or may be a combination of a symmetric keys, private and public keys, cryptographic hash functions, cryptographic algorithms, cryptographic systems, lightweight cryptographics, user-created passwords, randomly created passwords, encoded information, plaintext, cyphertext, random codes, pseudo-random codes, Caesar cipher codes, or any other password or encryption/cryptography created/enabled code. The encrypted dataset may exist solely or partially on the computing device, in the cryptographic key, in the cryptographic keychain (as will be described), in the primary program, on the external processor, on a dedicated processor, in the cloud, etc. The encrypted dataset may include encrypted sub-datasets created or stored in any of the aforementioned cases, such that a combination of the encrypted sub-datasets are required in order to form the full encrypted dataset.

The encrypted dataset may be an algorithm configured to receive visual data, such as that derived via a camera, or biological data, such as DNA or blood. Visual data obtained via a camera may include visual data depicting an instantaneous capture of a human iris, a face, a thumbprint, etc. The algorithm may be configured to determine whether the instantaneous capture matches a corresponding previously obtained dataset of a similar type, thereafter encrypted. The algorithm may be a set of algorithms, an expert system, and/or a neural network. The algorithm may comprise a hash function, which creates a hash value from encrypting and compressing various datasets relating to the system and/or random numbers.

In one embodiment, a cryptographic keychain is stored and installed on the device. The cryptographic keychain is configured to store and provide some level of viewing and activation access of the various cryptographic keys that are stored and installed on the device. The cryptographic keychain may be configured to align various attributes of the cryptographic keys as additional cryptographic keys are created, saved, installed, and run on the device. The cryptographic keychain may be referred to as a "smart pass wallet" and the individual cryptographic keys may be referred to as "smart passes". For convenience, the smart pass wallet may also be referred to as a "smart pass".

In one embodiment, when a user requests to access the primary program, the primary program will send a verification request to the smart pass. If the smart pass verifies the user and device, then the user is able to access the primary program via the device. Verification by the smart pass may be incumbent on the smart pass a. confirming the device via the encryption dataset, and b. receiving an input of a user identification input, and c. confirming the user identification input matches or is sufficiently similar to a previously confirmed user identification input. The user identification input may be a code or password entered by the user via an input means, such as a keyboard, mouse, or touch screen, or the presentation to a camera or other visual detection component of an eye, face, fingerprint, or similar identifying body part or secret/secure physical object, or even a blood sample to a needle or other pinprick device.

In one embodiment, when a user wishes to access the primary program, the user will select and run the smart pass prior to or immediately after requesting access to the primary program. The selection and running of the smart pass may occur via a user interface of the device, or via a physical dedicated smart pass button disposed on the device. In one embodiment, the user opens and runs the smart pass wallet, and then indicates which smart pass to actuate. Thus, the user is able to arrange for the verification only for the primary program to which the smart pass is dedicated without having to first access and request verification via the particular primary program.

DETAILED DESCRIPTION

Figure 1:
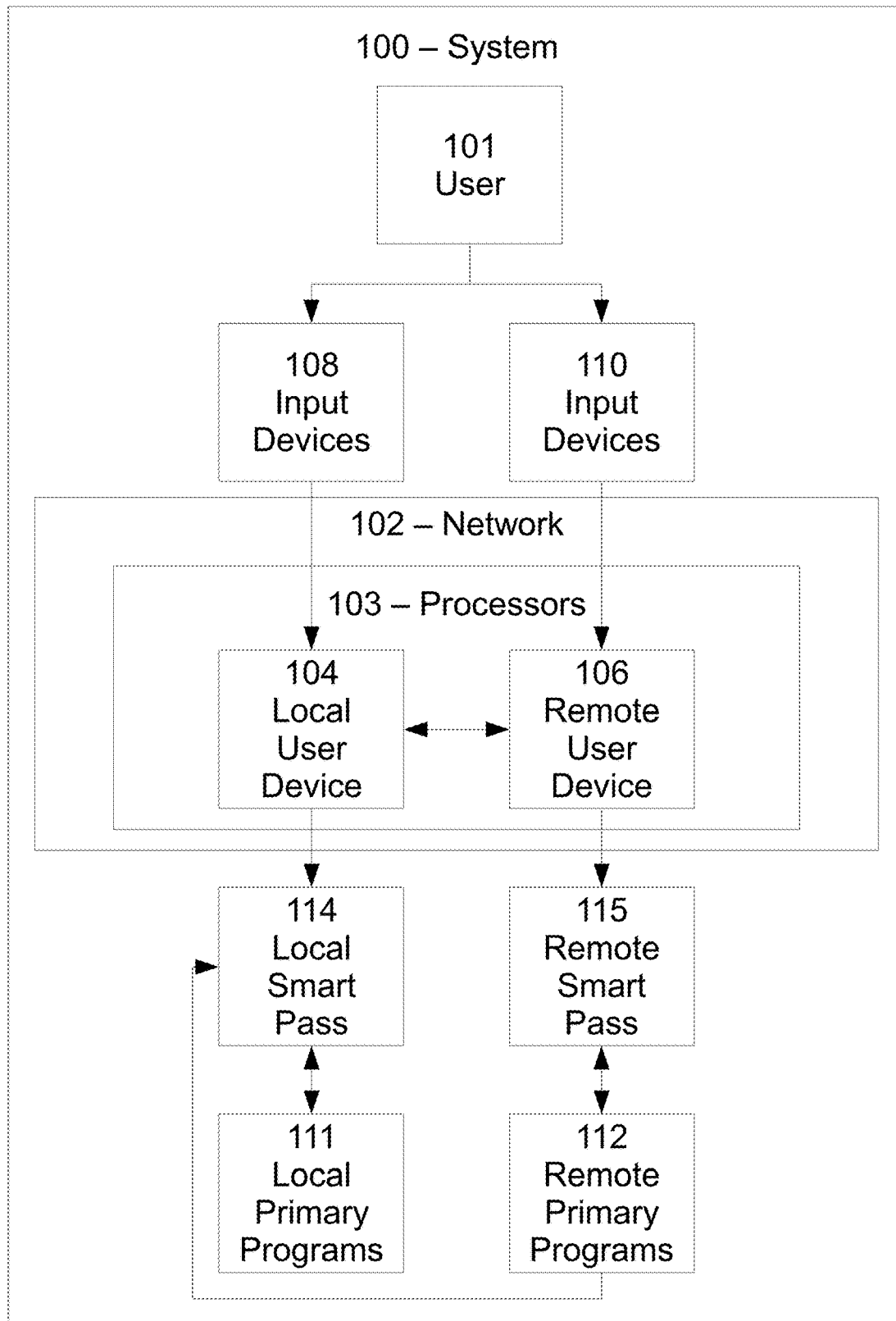
FIG. 1 shows an exemplary system.

FIG. 1 shows an exemplary system 100 comprising a set of processors or devices comprising processors 103 configured to operate over a network 102, a first ("local") user device 104, a second ("remote") user device 106, a set of input devices 108, 110, a first ("local") set of primary programs 111, a second ("remote") set of primary programs 112, a first ("local") smart pass program 114, a second ("remote") smart pass program 116, and a user 101. In normal usage, only the user operates the local and remote user devices. The local smart pass program is installed on and operates on the local user device and the remote smart pass program is installed on and operates on the remote user device. The local smart pass program may be configured to create and store a plurality of local cryptographic keys on the local user device and the remote smart pass program may be configured to create and store a plurality of "remote" cryptographic keys on the remote user device. The terms "local" and "remote" are use, first, when there is a plurality of user devices, and one of the user devices is treated by the system as closer to the user, and therefore more secure. However, the designation of which user device is the more secure of a set may changed based on context. For example, the first user device engaged by the user or the primary program may be considered "remote" in that the second user device, as a backup, provides greater security to the process of accessing the primary program. If a party other than the user is attempting to access a remote primary program without access to the local user device, then the system will prevent access to the remote primary program.

Each primary program may be a software application, a browser, a website, an online platform, or a combination thereof. The smart pass programs may be installed on user devices and configured to communicate with each other as well as primary programs.

Figure 2:
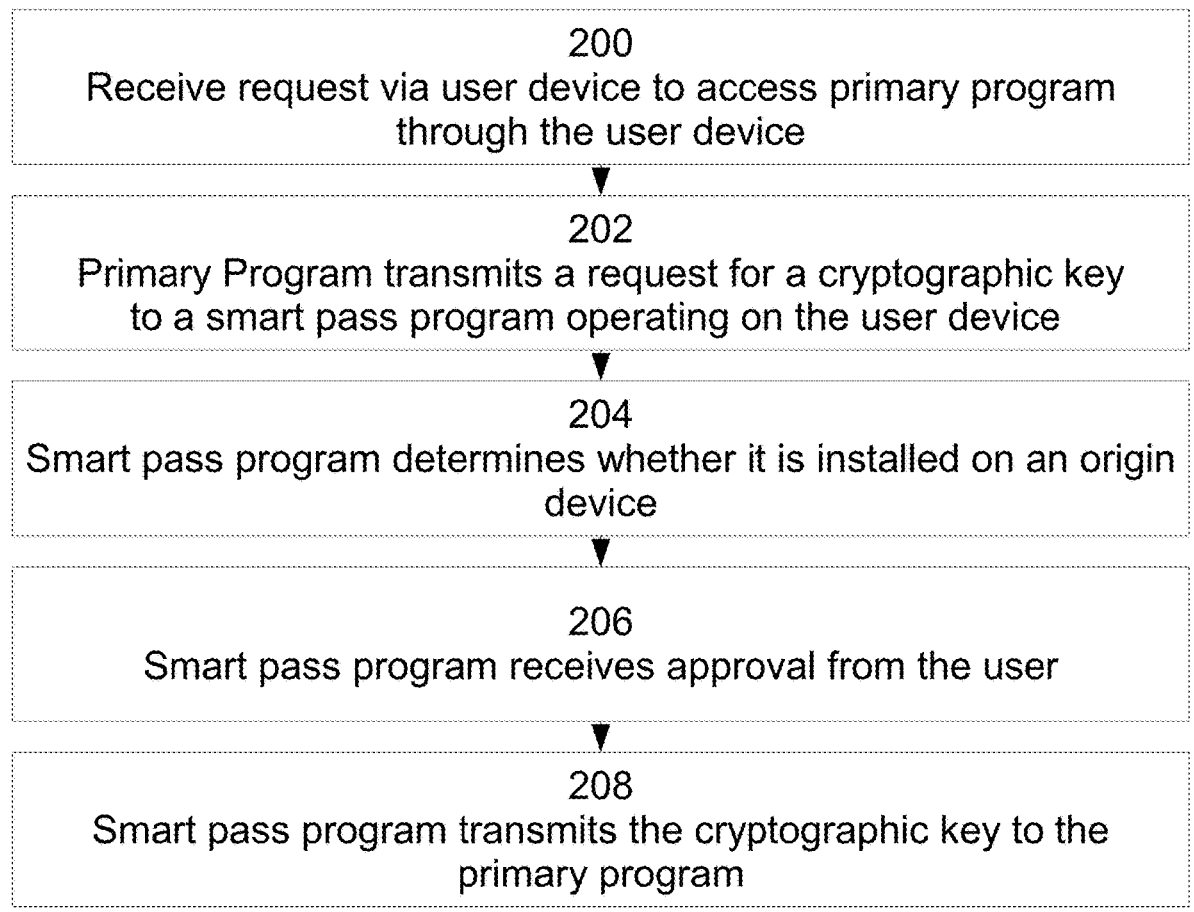
FIG. 2 is a flowchart showing an exemplary system process for securely obtaining access to a primary program by requesting access from the primary program.

FIG. 2 shows an exemplary system process. Upon receiving a request via a user device from a user to access a primary program through the user device 200, the primary program may transmit a request to a smart pass program operating on the user device for a dedicated cryptographic key 202. The smart pass program may first determine whether it is installed on an origin device 204, which is the device on which the smart pass program was initially installed, and upon receiving approval from the user 206, transmit the cryptographic key to the primary program 208. In this process, since the user is requesting access directly of the primary program, the smart pass program may need the user's permission to transmit the cryptographic key.

Figure 3:
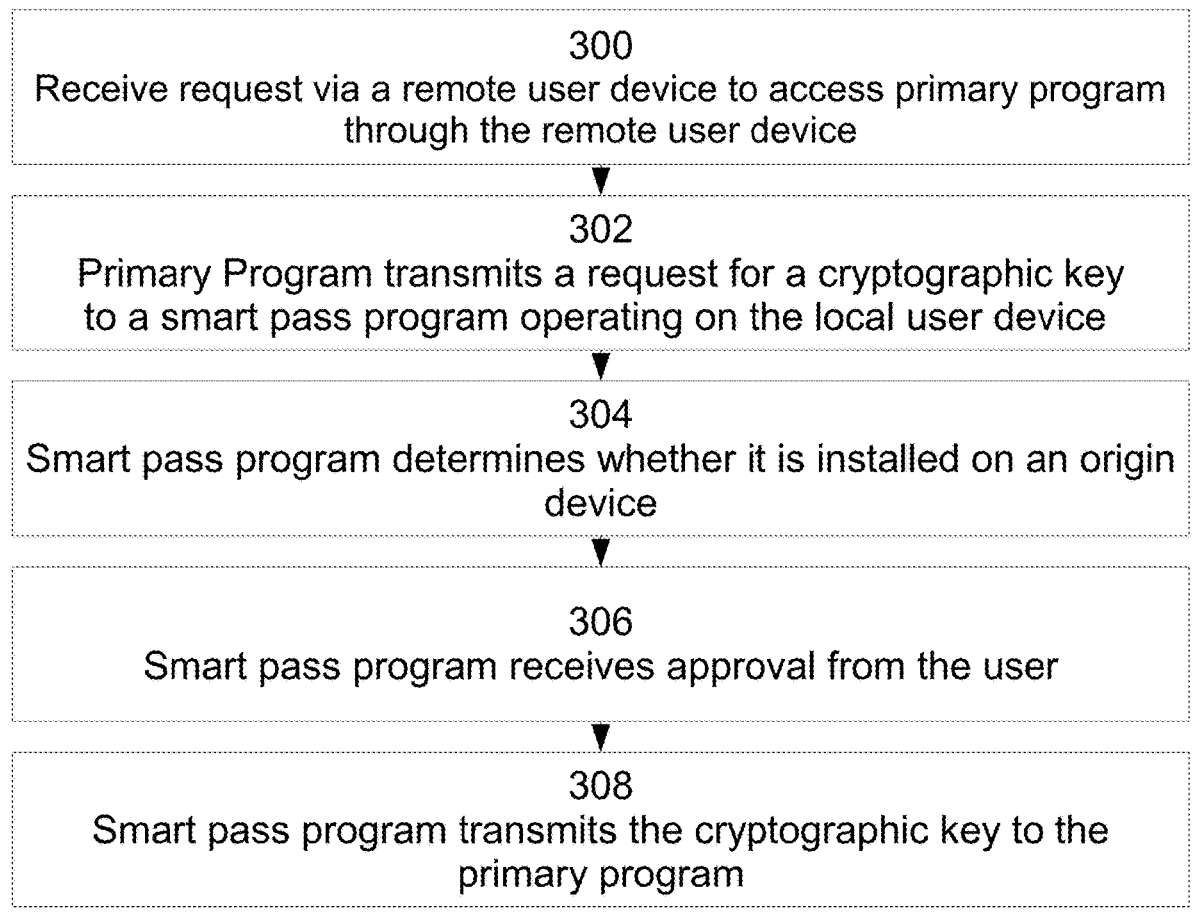
FIG. 3 is a flowchart showing an exemplary system process for securely obtaining access to a primary program on a remote device by requesting access from the primary program.

FIG. 3 shows an exemplary system process. Upon receiving a request via a remote user device from a user to access a primary program through the remote user device 300, the primary program may transmit a request to a smart pass program operating on a local user device for a dedicated cryptographic key 302. The smart pass program may first determine whether it is installed on an origin device 304, which is the device on which the smart pass program was initially installed, and upon receiving approval from the user 306, transmit the cryptographic key to the primary program 308. In this process, since the user is requesting access via a remote user device on which the smart pass program is not operating, the smart pass program may need the user's permission to transmit the cryptographic key.

Figure 4:
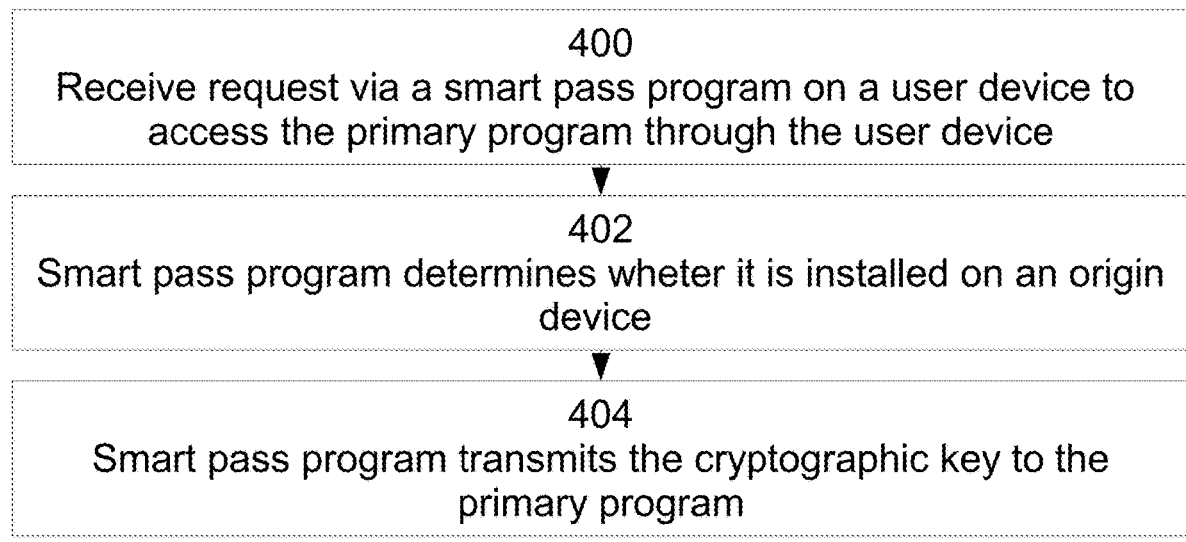
FIG. 4 is a flowchart showing an exemplary system process for securely obtaining access to a primary program by requesting access from a smart pass program.

FIG. 4 shows an exemplary system process. Upon receiving a request via a smart pass program on a user device from a user to access a primary program through the user device 400, a smart pass program may determine whether it is installed on an origin device 402, and if so, transmit to the primary program a cryptographic key dedicated to that primary program 404. In this process, since the user is requesting access to the primary program via the smart pass program, the smart pass program does not need additional permission from the user to transmit the cryptographic key to the primary program.

Figure 5:
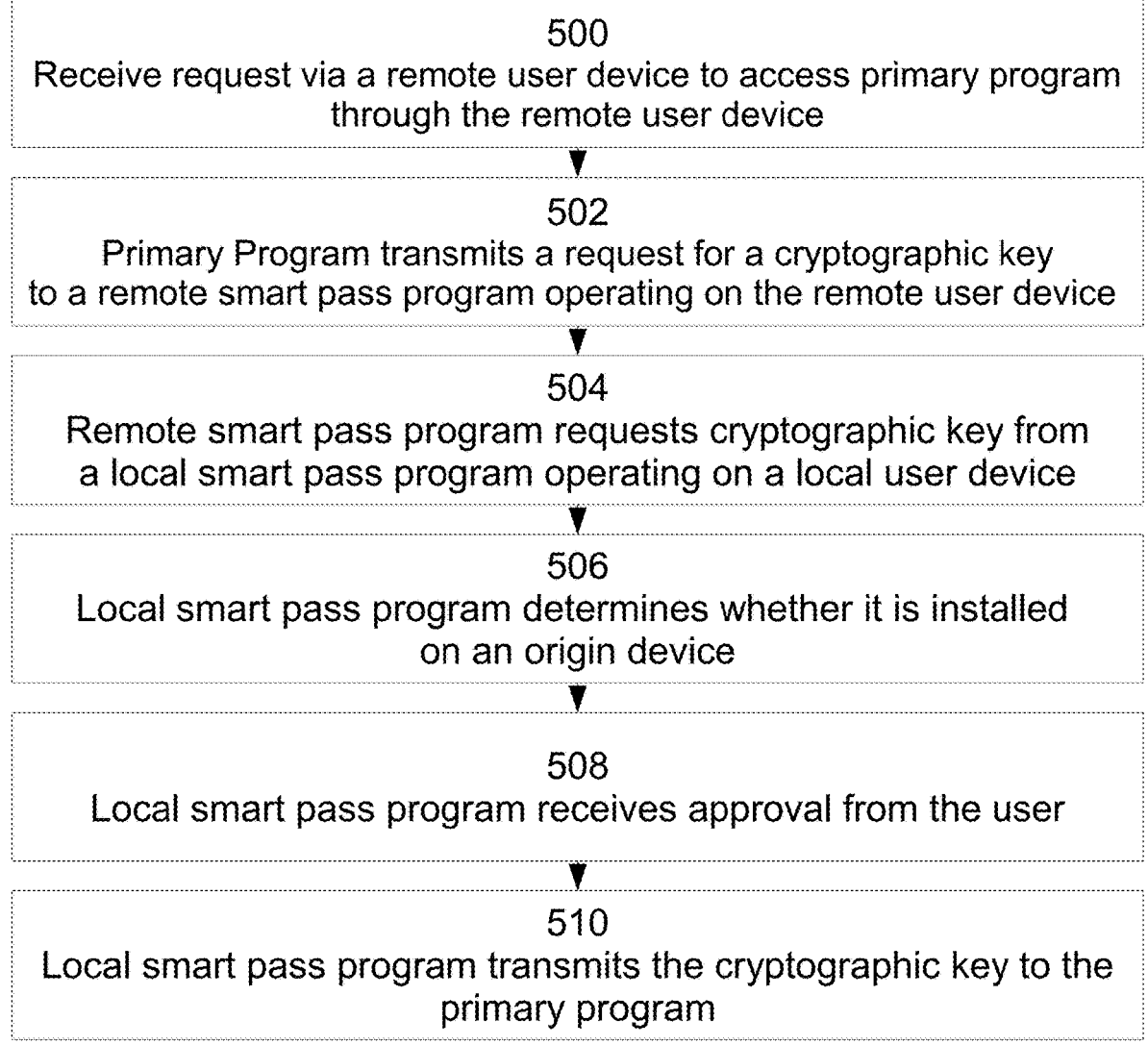
FIG. 5 is a flowchart showing an exemplary system process for securely obtaining access to a primary program on a remote device by requesting access from the primary program, with access secured via a local smart pass program and a remote smart pass program.

FIG. 5 shows an exemplary system process. Upon receiving a request via a remote user device, such as a computer, to access a primary program through the remote user device 500, the primary program may request a cryptographic key from a remote smart pass program operating on the remote user device 502. The remote smart pass program may then request the cryptographic key from a local smart pass program, operating on a local user device, such as a phone 504. The local smart pass program may first determine whether it is installed on an origin device 506, and upon receiving approval from the user 508, transmit to the primary program a cryptographic key dedicated to that primary program 510. In this process, since the user is a. requesting access directly of the primary program and b. via the remote user device, the local smart pass program may need the user's permission to transmit the cryptographic key.

Figure 6:
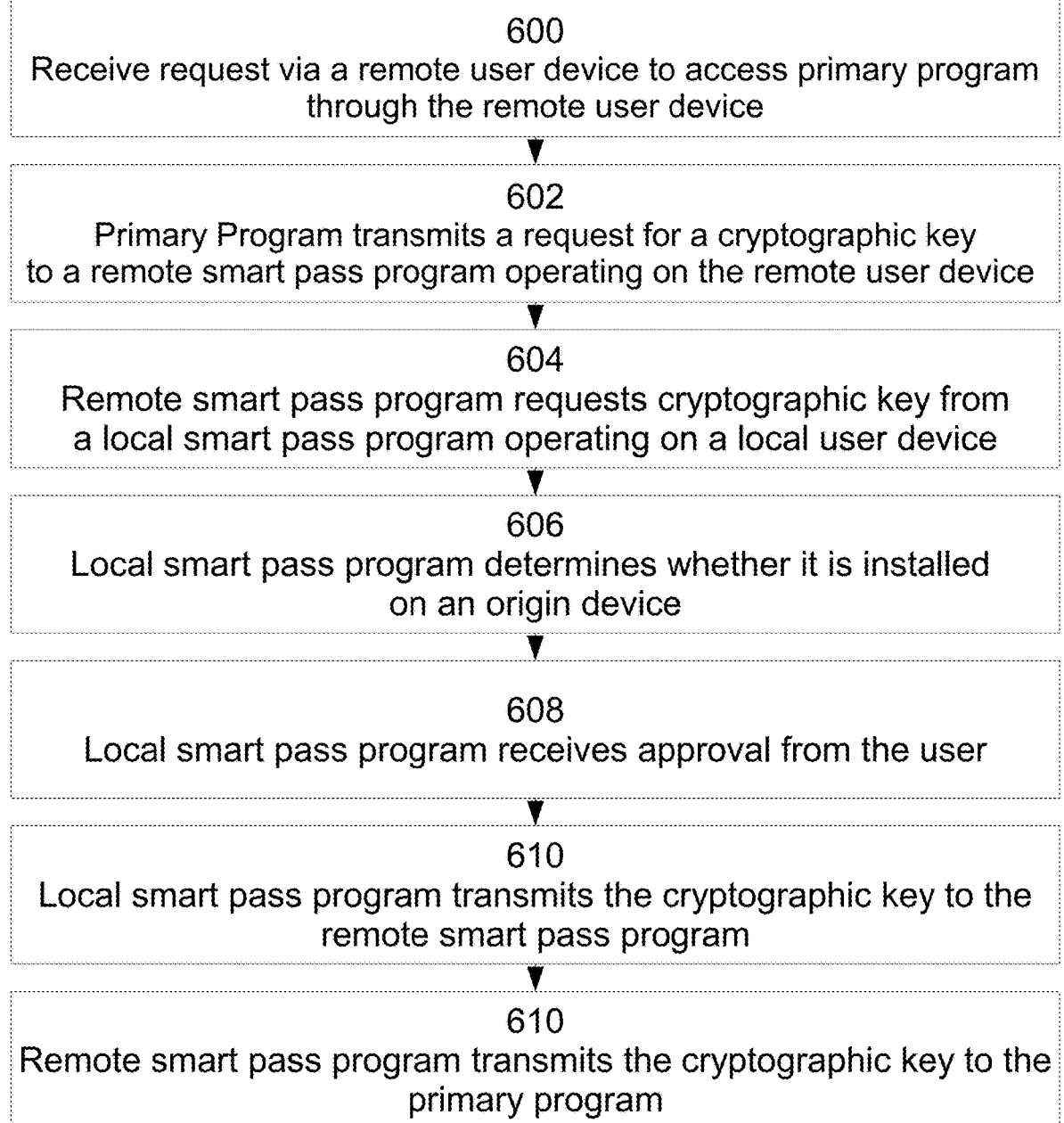
FIG. 6 is a flowchart showing an exemplary system process for securely obtaining access to a primary program on a remote device by requesting access from the primary program, with access secured via a local smart pass program and a remote smart pass program.

FIG. 6 shows an exemplary system process. Upon receiving a request via a remote user device to access a primary program through a remote user device 600, the primary program may request a cryptographic key from a remote smart pass program operating on the remote user device 602. The remote smart pass program may then request the cryptographic key from a local smart pass program, operating on a local user device, such as a phone 604. The local smart pass program may first determine whether it is installed on an origin device 606, and upon receiving approval from the user 608, transmit to the remote smart pass program a cryptographic key dedicated to that primary program 610. The remote smart pass program may then transmit the cryptographic key to the primary program 612. As in the process described by FIG. 5, since the user is a. requesting access directly of the primary program and b. via the remote user device, the local smart pass program may need the user's permission to transmit the cryptographic key to the remote smart pass program. However, the remote smart pass program does not need additional permission from the user to transmit the cryptographic key received by the local smart pass program to the primary program.

Figure 7:
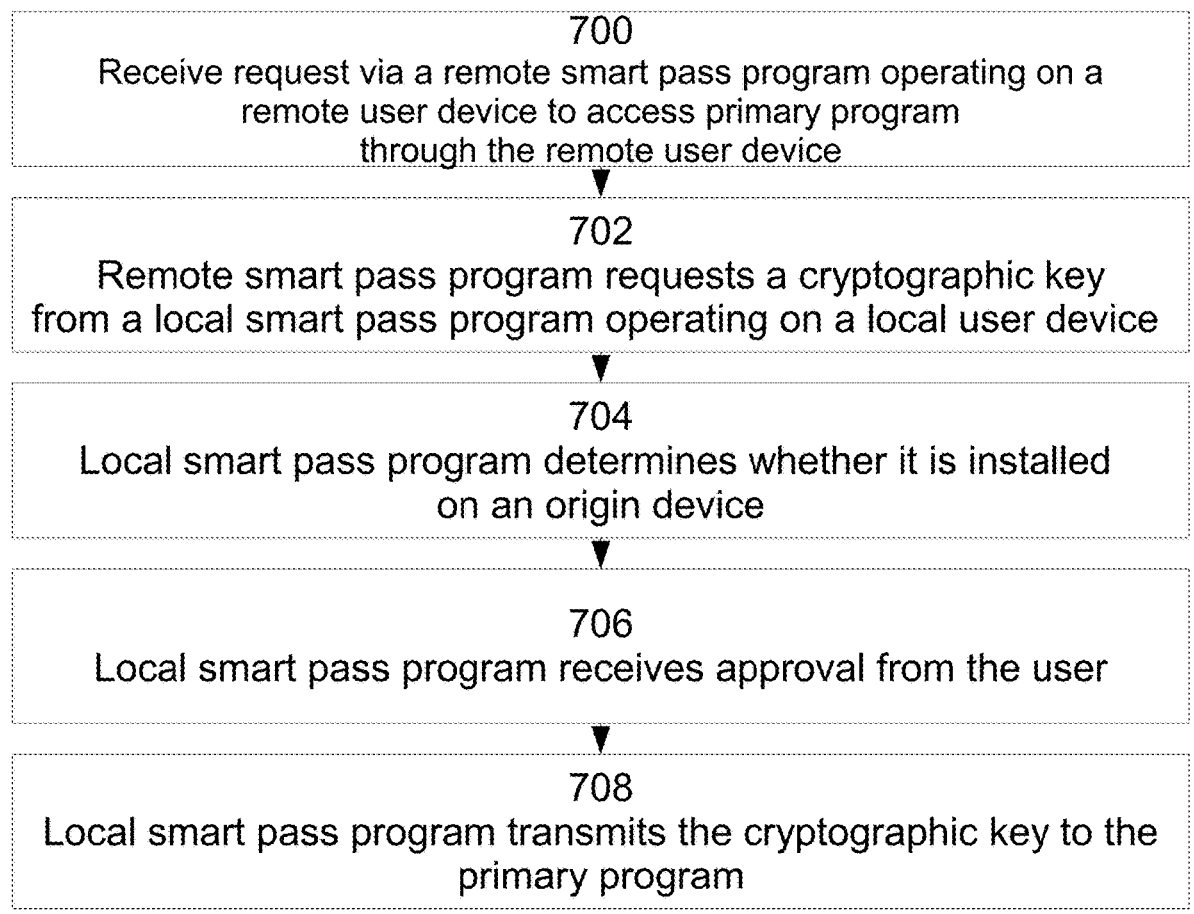
FIG. 7 is a flowchart showing an exemplary system process for securely obtaining access to a primary program on a remote device by requesting access from a remote smart pass program, with access secured via a local smart pass program.

FIG. 7 shows an exemplary system process. Upon receiving a request via a remote smart pass program operating on a remote user device to access a primary program through the remote user device 700, the remote smart pass program may request a cryptographic key from a local smart pass program, operating on a local user device, such as a phone 702. The local smart pass program may first determine whether it is installed on an origin device 704, and upon receiving approval from the user 706, transmit to the primary program a cryptographic key dedicated to that primary program 708.

Figure 8:
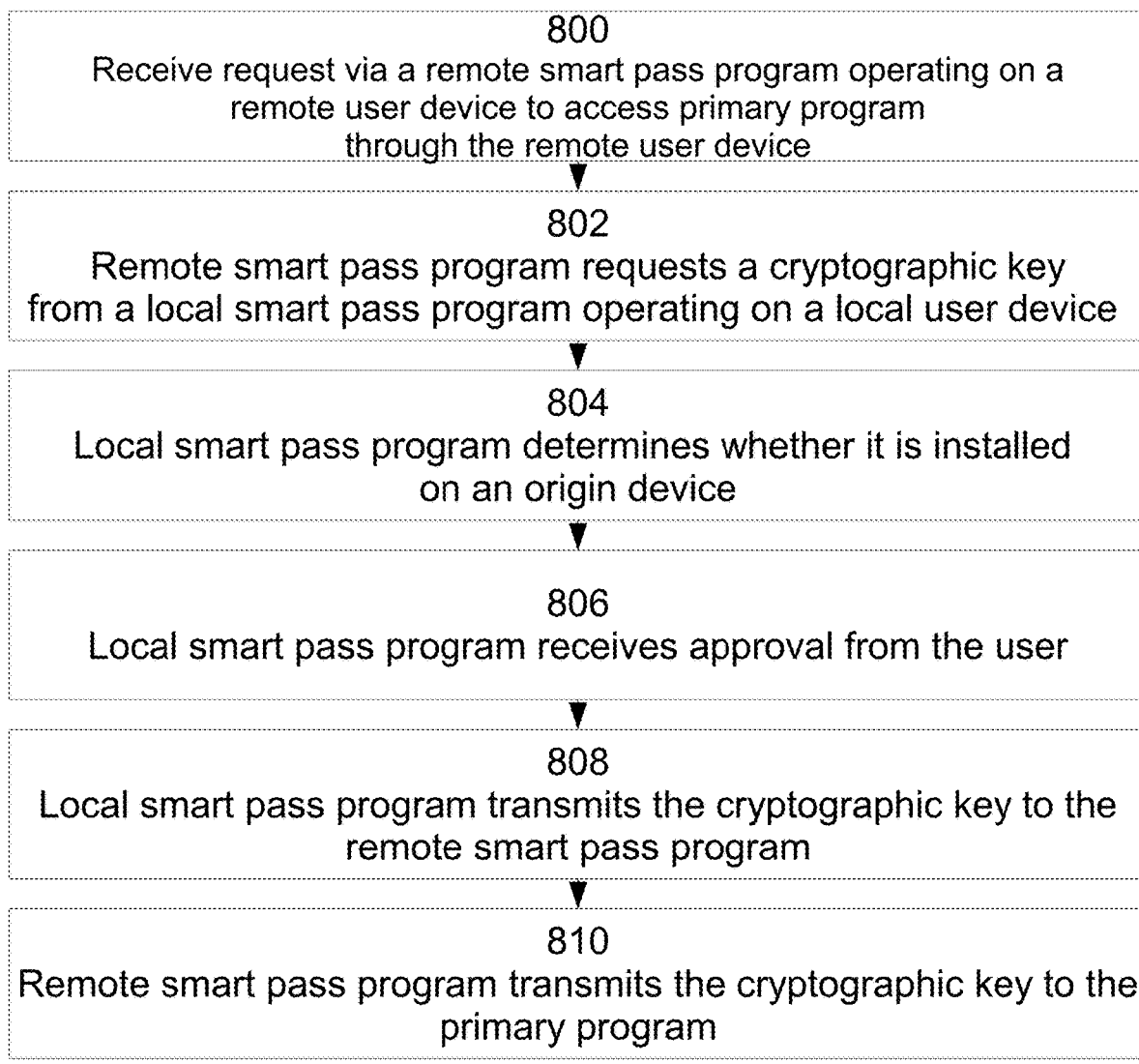
FIG. 8 is a flowchart showing an exemplary system process for securely obtaining access to a primary program on a remote device by requesting access from a remote smart pass program, with access secured via a local smart pass program and a remote smart pass program.

FIG. 8 shows an exemplary system process. Upon receiving a request via a remote smart pass program operating on a remote user device to access a primary program through the remote user device 800, the remote smart pass program may request a cryptographic key from a local smart pass program, operating on a local user device, such as a phone 802. The local smart pass program may first determine whether it is installed on an origin device 804, and upon receiving approval from the user 706, transmit to the remote smart pass program a cryptographic key dedicated to that primary program 708. Then the remote smart pass program may then transmit the cryptographic key to the primary program 710.

Figure 9:
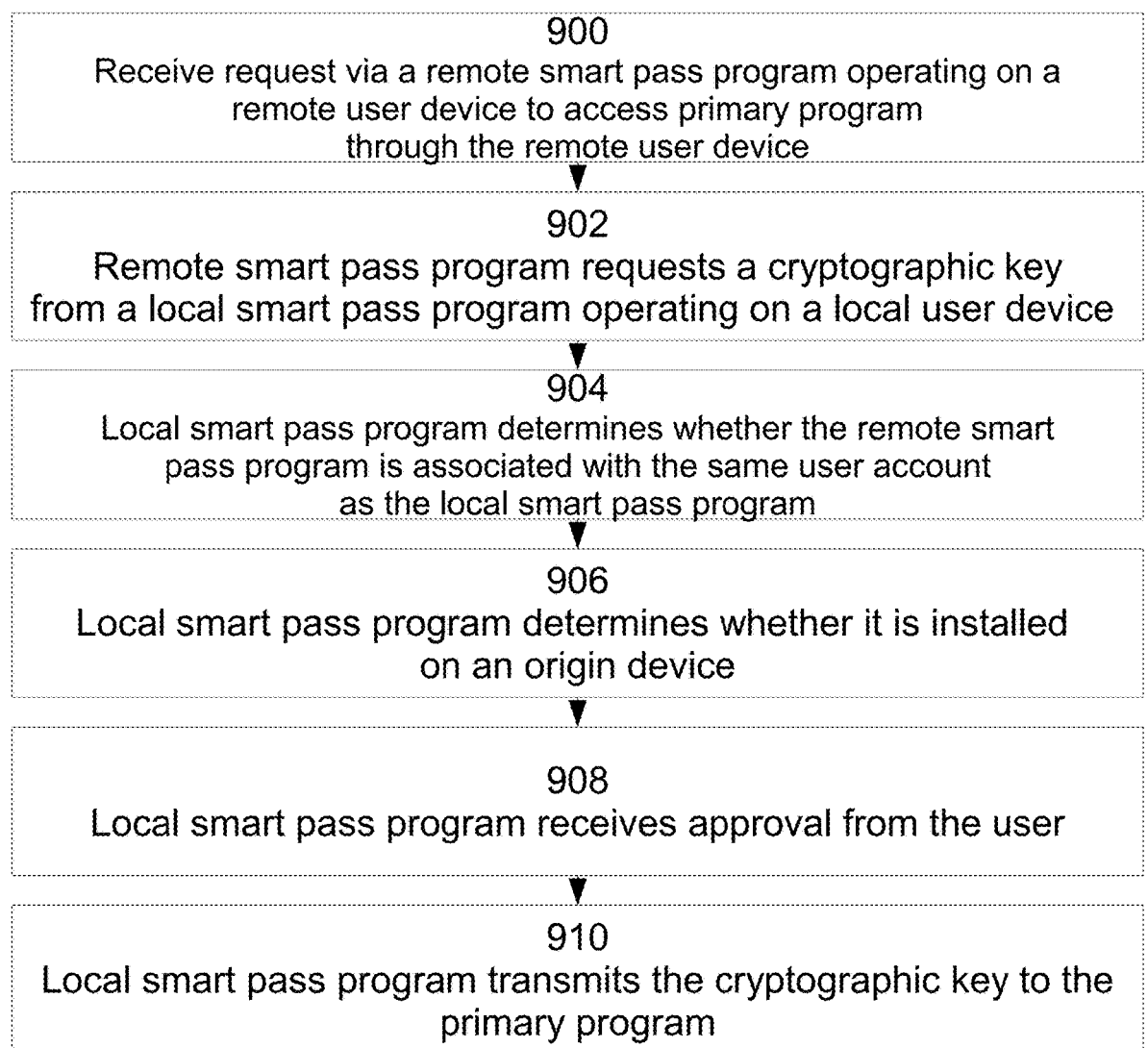
FIG. 9 is a flowchart showing an exemplary system process for securely obtaining access to a primary program on a remote device by requesting access from a remote smart pass program, with access secured via a local smart pass program and a remote smart pass program.

FIG. 9 shows an exemplary system process. Upon receiving a request via a remote smart pass program operating on a remote user device to access a primary program through the remote user device 900, the remote smart pass program may request a cryptographic key from a local smart pass program, operating on a local user device, such as a phone 902. The local smart pass program may first determine whether the remote smart pass program is associated with the same user as the local smart pass program 904, then determine whether it is installed on an origin device 906, and upon receiving approval from the user 908, transmit to the primary program a cryptographic key dedicated to that primary program 910.

Figure 10:
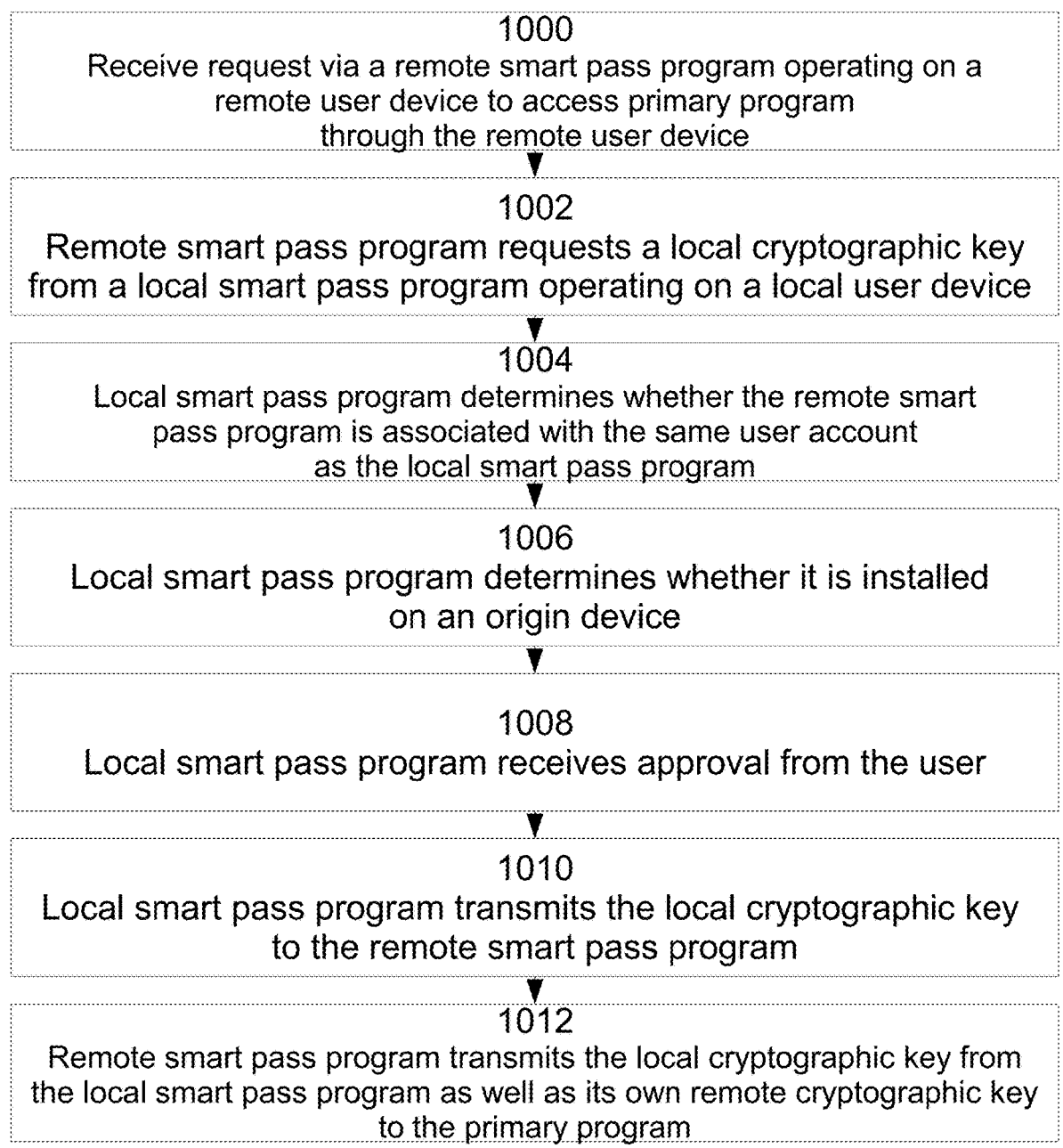
FIG. 10 is a flowchart showing an exemplary system process for securely obtaining access to a primary program on a remote device by requesting access from a remote smart pass program, with access secured via a local smart pass program transmitting a local key and a remote smart pass program transmitting a remote key.

FIG. 10 shows an exemplary system process. Upon receiving a request via a remote smart pass program operating on a remote user device to access a primary program through the remote user device 1000, the remote smart pass program may request a cryptographic key from a local smart pass program, operating on a local user device, such as a phone 1002. The local smart pass program may first determine whether the remote smart pass program is associated with the same user as the local smart pass program 1004, then determine whether it is installed on an origin device 1006, and upon receiving approval from the user 1008, transmit to the remote smart pass program a cryptographic key dedicated to that primary program 1010. Then the remote smart pass program may then transmit the cryptographic key from the local smart pass program as well as its own cryptographic key to the primary program 1012.

Figure 11:
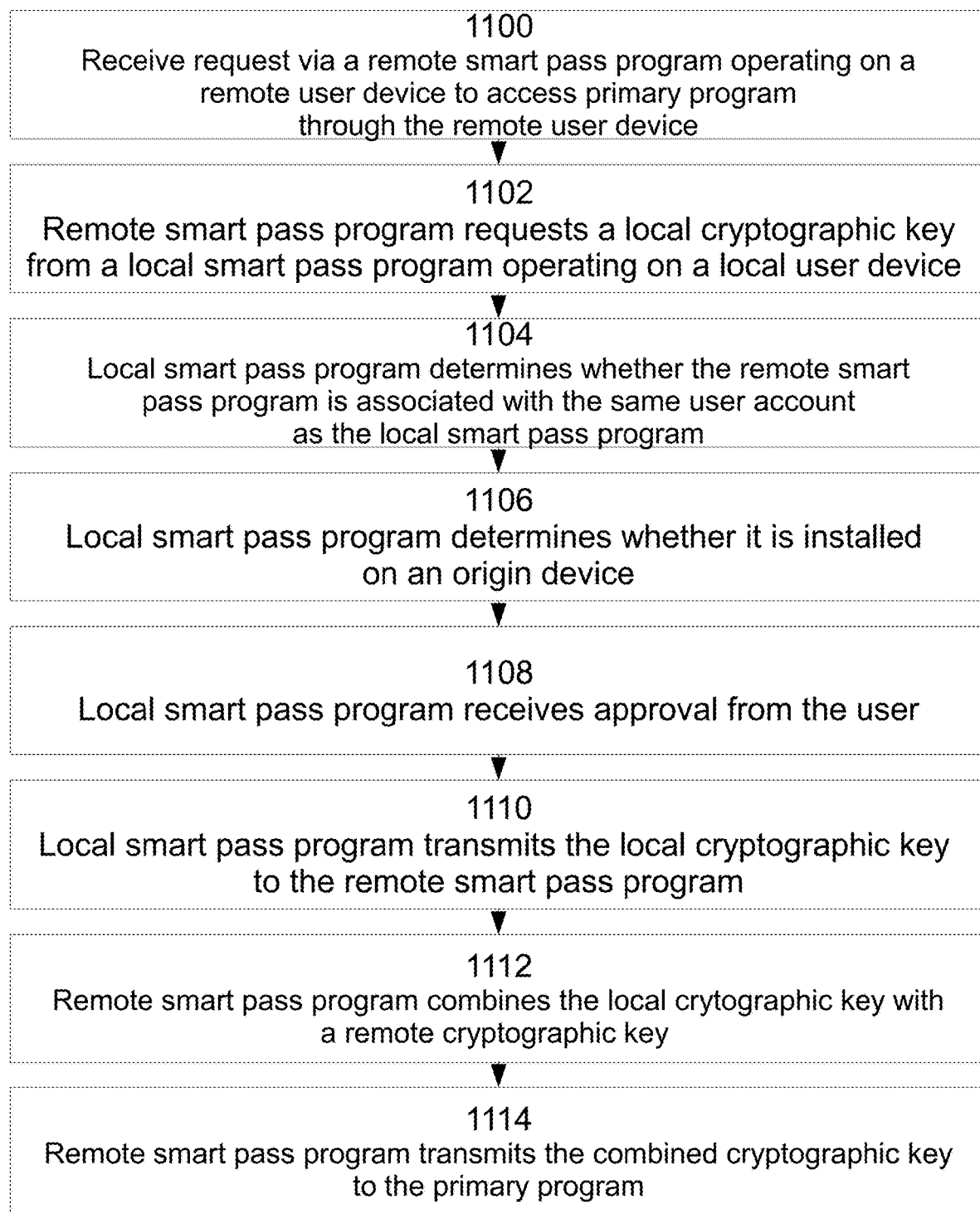
FIG. 11 is a flowchart showing an exemplary system process for securely obtaining access to a primary program on a remote device by requesting access from a remote smart pass program, with access secured via a remote smart pass program combining a remote key with a local key from a local smart pass program and transmitting the combined key.

FIG. 11 shows an exemplary system process. Upon receiving a request via a remote smart pass program operating on a remote user device to access a primary program through the remote user device 1100, the remote smart pass program may request a local cryptographic key from a local smart pass program, operating on a local user device, such as a phone 1102. The local smart pass program may first determine whether the remote smart pass program is associated with the same user as the local smart pass program 1104, then determine whether it is installed on an origin device 1106, and upon receiving approval from the user 1108, transmit to the local remote smart pass program a local cryptographic key dedicated to that primary program 1110. Then the remote smart pass program may then combine the cryptographic key from the local smart pass program with its own remote cryptographic key 1112. The remote smart pass program may then transmit the combined cryptographic key to the primary program 1114.

Figure 12:
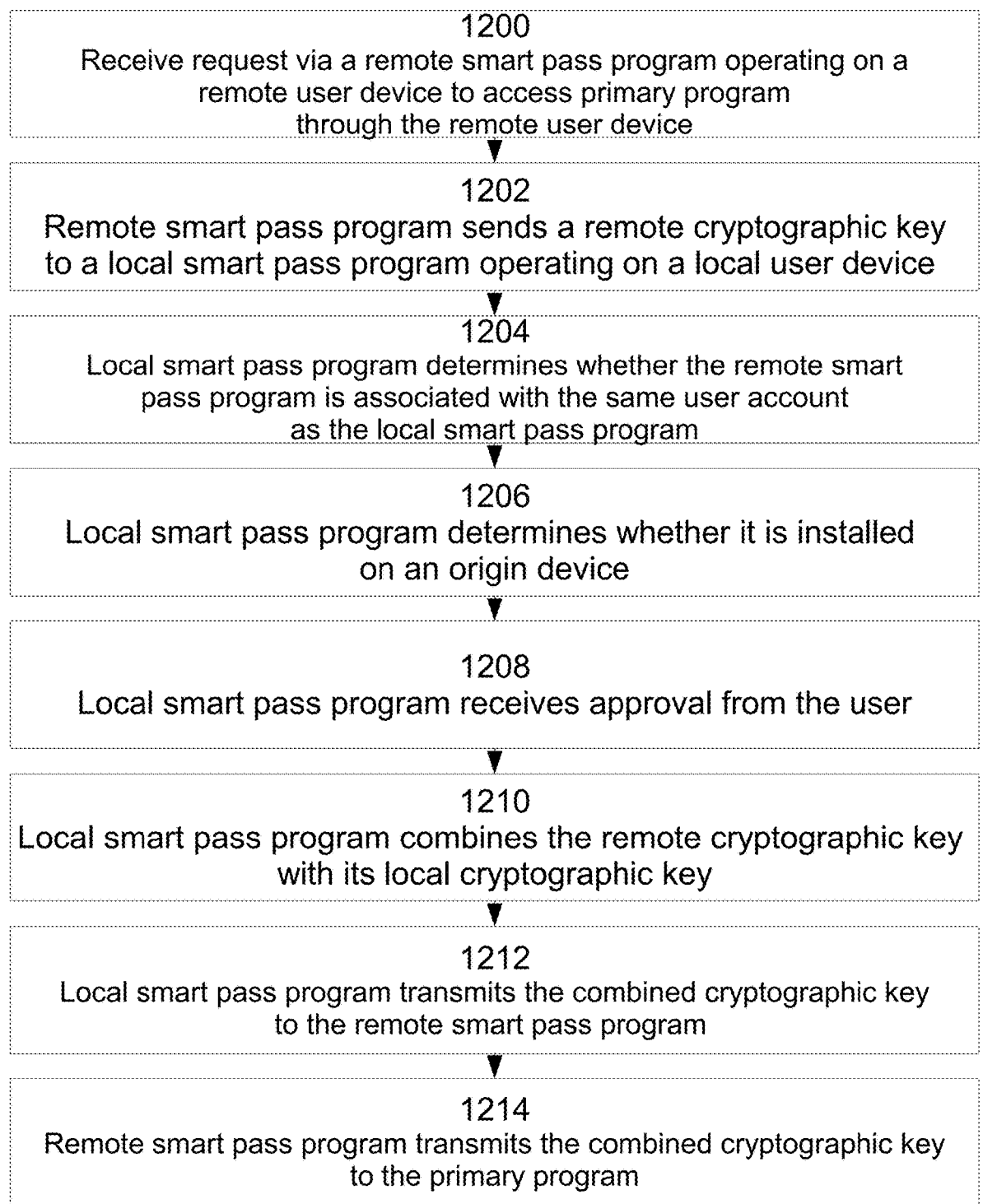
FIG. 12 is a flowchart showing an exemplary system process for securely obtaining access to a primary program on a remote device by requesting access from a remote smart pass program, with access secured via a local smart pass program combining a local key with a remote key from a remote smart pass program and transmitting the combined key.

FIG. 12 shows an exemplary system process. Upon receiving a request via a remote smart pass program operating on a remote user device to access a primary program through the remote user device 1200, the remote smart pass program may send a remote dedicated cryptographic key to the local smart pass program operating on a local user device 1202. The local smart pass program may first determine whether the remote smart pass program is associated with the same user as the local smart pass program or that the remote dedicated cryptographic key is authentic 1204, then determine whether it (the local smart pass program) is installed on an origin device 1206, and upon receiving approval from the user 1208, combine the remote dedicated cryptographic key with a first ("local") cryptographic key, 1210, with the local cryptographic key being created or managed by the local smart pass program, and then transmit to the remote smart pass program the combined cryptographic 1212. Then the remote smart pass program may then transmit the combined cryptographic key to the primary program 1214.

Figure 13:
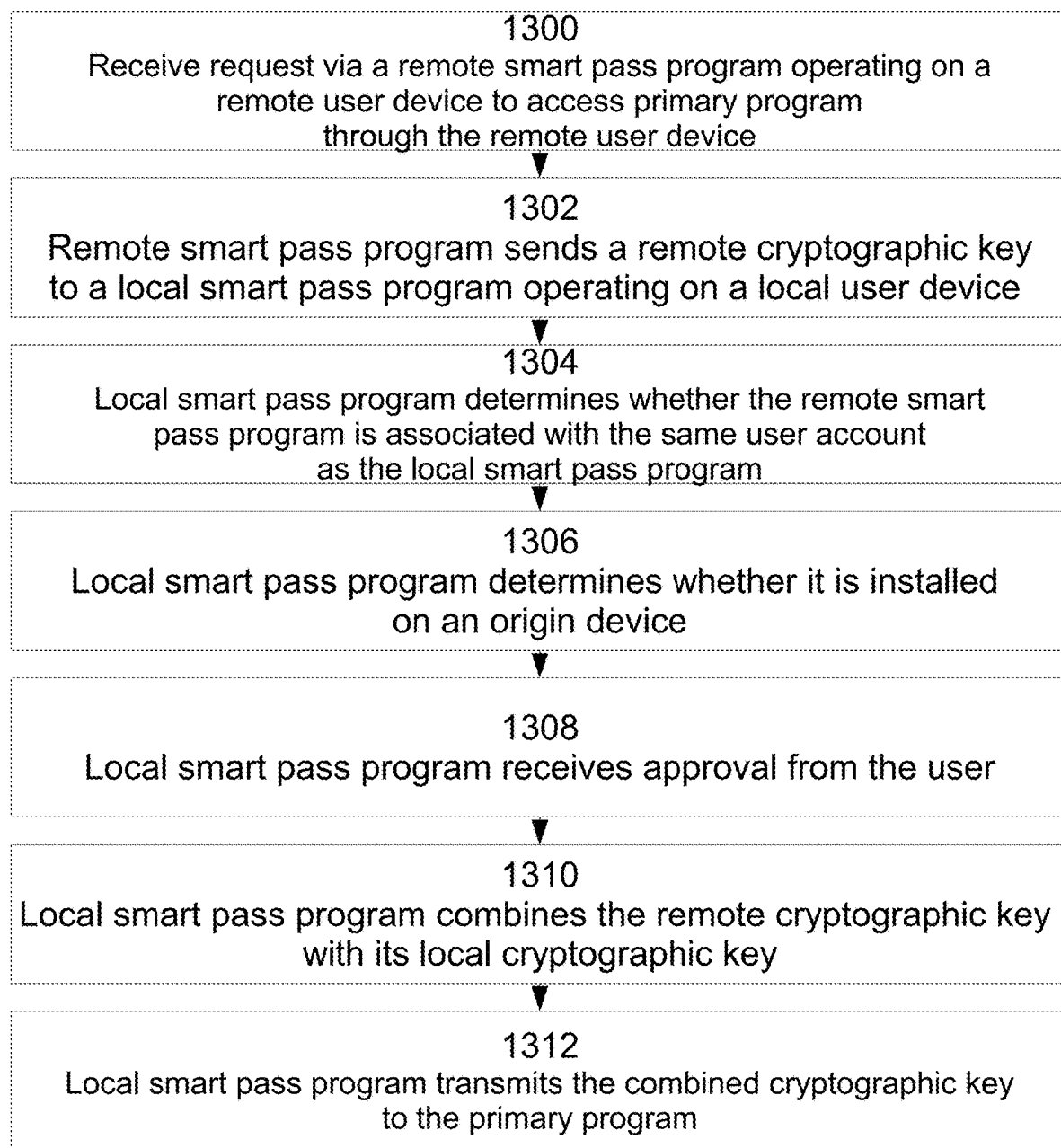
FIG. 13 is a flowchart showing an exemplary system process for securely obtaining access to a primary program on a remote device by requesting access from a remote smart pass program, with access secured via a local smart pass program combining a local key with a remote key from a remote smart pass program and transmitting the combined key.

FIG. 13 shows an exemplary system process. Upon receiving a request via a remote smart pass program operating on a remote user device to access a primary program through the remote user device 1300, the remote smart pass program may send a remote dedicated cryptographic key to the local smart pass program operating on a local user device 1302. The local smart pass program may first determine whether the remote smart pass program is associated with the same user as the local smart pass program or that the remote dedicated cryptographic key is authentic 1304, then determine whether it (the local smart pass program) is installed on an origin device 1306, and upon receiving approval from the user 1308, combine the remote dedicated cryptographic key with a local cryptographic key 1310, with the local cryptographic key being created or managed by the local smart pass program, and then transmit to the combined cryptographic key to the primary program 1312.

As variations, the system process described in FIGS. 2-13 can be modified such that instead of or in addition to recognizing the device as an origin device, the smart pass program may also confirm that the phone number associated with the user device was the origin number, the user account associated with the user device has been verified, the user account associated with the device is also associated with the user account on the primary program from which access is being requested, input data received by the user device on which the smart pass program is installed matches identification data associated with the user requesting access to the primary program (such as visual eye, fingerprint, and/or face data, username, password, and/or pin data).

In one embodiment, a first user (e.g., a local user) operates a first user device (e.g., a local user device) and a second user (e.g., a remote user) operates a second suer device (e.g., a remote user device). A first smart pass program may be installed on the first user device and a second smart pass program may be installed on the second user device. Both the first and second user may have access to a common primary program, but the first user has a first user account and the second user has a second user account.

The first and second user accounts may be each accessible via first and second user portions, with the "portion" being a combination of a local user interface of the common primary program, the user account accessed via the user interface, and any account preferences, rights, settings, database entries, or other data associated therewith.

Access to the first user portion by the second user may be predicated on transmission of a first cryptographic key by the second pass program to the first pass program, either directly or via the common primary program. In one variation, the primary program is an electronic mail platform, and the second user cannot send an email to the first user unless the second user is able to transmit, via the second smart pass program, the first cryptographic key. Thus, if the first user wishes to receive an email from the second user, the first user must first transmit the first cryptographic key to the second user.

In one variation of the above embodiment, cryptographic keys contain hashes that, when analyzed by a smart pass program, define the second user's scope of access to the first user portion permitted by the first smart pass program. Further, this scope can be defined by the first user. For example, if the first user intends to permit the second user to send emails to the first user for a set period of time and/or for a set number of emails, that set period of time and/or set number of emails may be incorporated into the hash. In one variation, the hash may designate the second user and the second smart pass program, but not other users or other smart pass programs, and would therefore be unusable by any such other users or other smart pass programs.

The smart pass programs may also be considered smart pass modules. They may form part of or merely engage with an existing module, program, platform, or application. Similarly, the (common) primary program may be an application or platform. The platforms, programs, modules, and/or applications may be online and accessible via a browser, or operate be installed locally with access to a network or the internet generally.

Each user, user account, and/or user portion may have a unique user portion identifier to identify or otherwise designate the same. The user portion identifier may be a username, a hash of the username, an email address, or a hash of the email address.

In one embodiment, the system comprises a set of processors operating over a network, with the processors engaged to a plurality of devices, including a first user device and a second user device. A primary application, (e.g., an online program or platform, such as an email or messaging platform) is accessible to the user devices via the network.

The primary application may have a first user portion and a second user portion, with the first user portion comprising a user account and/or user portal configured to be accessed or logged into via a user of the first user device (i.e., a first user), and similarly with the second user portion for the second user device.

A first smart pass module may be installed on or accessed via the first user device and the second smart pass module may be installed on or accessed via the second user device. The smart pass modules may form part of the user portions or may be merely configured to engage with the same.

Each of the first and second user portions may be assigned (or may be selected by the user) user portion identifiers, such as usernames or email addresses. These user portion identifiers should preferably be unique for each user.

The first user portion may receive a request (from the first user) to enable communications to be received by the first user portion from the second user portion. The first user may enable such receipt by entering or otherwise selecting the second user portion identifier so as to designate the second user. This may be referred to as an "approval designation".

The first user portion may then, via the first smart pass module, create or select a cryptographic key which is desirably unique to the second user, and transmit this cryptographic key to the second user portion via the smart pass module (or to the second smart pass module via the second user portion). The cryptographic key may be embedded in or accompanied by special message or email.

Upon receipt of this cryptographic key, the second smart pass module may enable the second user to confirm the receipt of the same via the second user device. Upon confirmation, the second smart pass module may designate the second user device as an "origin device". A designation of the second user device as an origin device may then be relayed to the first smart pass module so that the cryptographic key is associated with the second user device. Thereafter, the second user may, via the second user device, second smart pass module, and second user portion, transmit communications to the first user.

Upon the detection of an attempt to send a communication, the smart pass modules may confirm that the communication is being sent not only by a second user via a smart pass program in possession of the cryptographic key, but also that it is being sent via the second user device rather than some other device accessing the second user portion. Confirmation of the same may involve the sending of the cryptographic key to the first smart pass module by the second smart pass module. As a condition precedent to transmitting the cryptographic key, the second smart pass module may first confirm that it is operating on or being accessed by the origin device.

In a variation or in addition to the above, the first user portion may reject attempts by the second user portion to transmit communications unless it confirms that the first smart pass module has received a cryptographic key from the second smart pass module and that this cryptographic key matches the one originally sent by the first smart pass module to the second smart pass module.

In one variation, the second smart pass module may create an accompanying cryptographic key using an encrypted form of data stored on or describing the origin device. The second smart pass module may transmit this accompanying cryptographic key to the first smart pass module and each time a communication is sent (together with the "primary" cryptographic key). Thereafter, the first smart pass module will determine whether the primary cryptographic key and accompanying cryptographic key sent with a communication match the primary cryptographic key and accompanying cryptographic key before receiving the communication.

If the first smart pass module determines that the primary cryptographic key matches but the accompanying cryptographic key does not, it may transmit a message to the second smart pass module that the communication is not being sent via the origin device, and the second smart pass module may then alert the alleged second user of this fact via the second user portion. If the first smart pass module does not determine that the primary cryptographic key matches, it may reject the communication entirely and send no warning or notification to the alleged second smart pass module.

Figure 14:
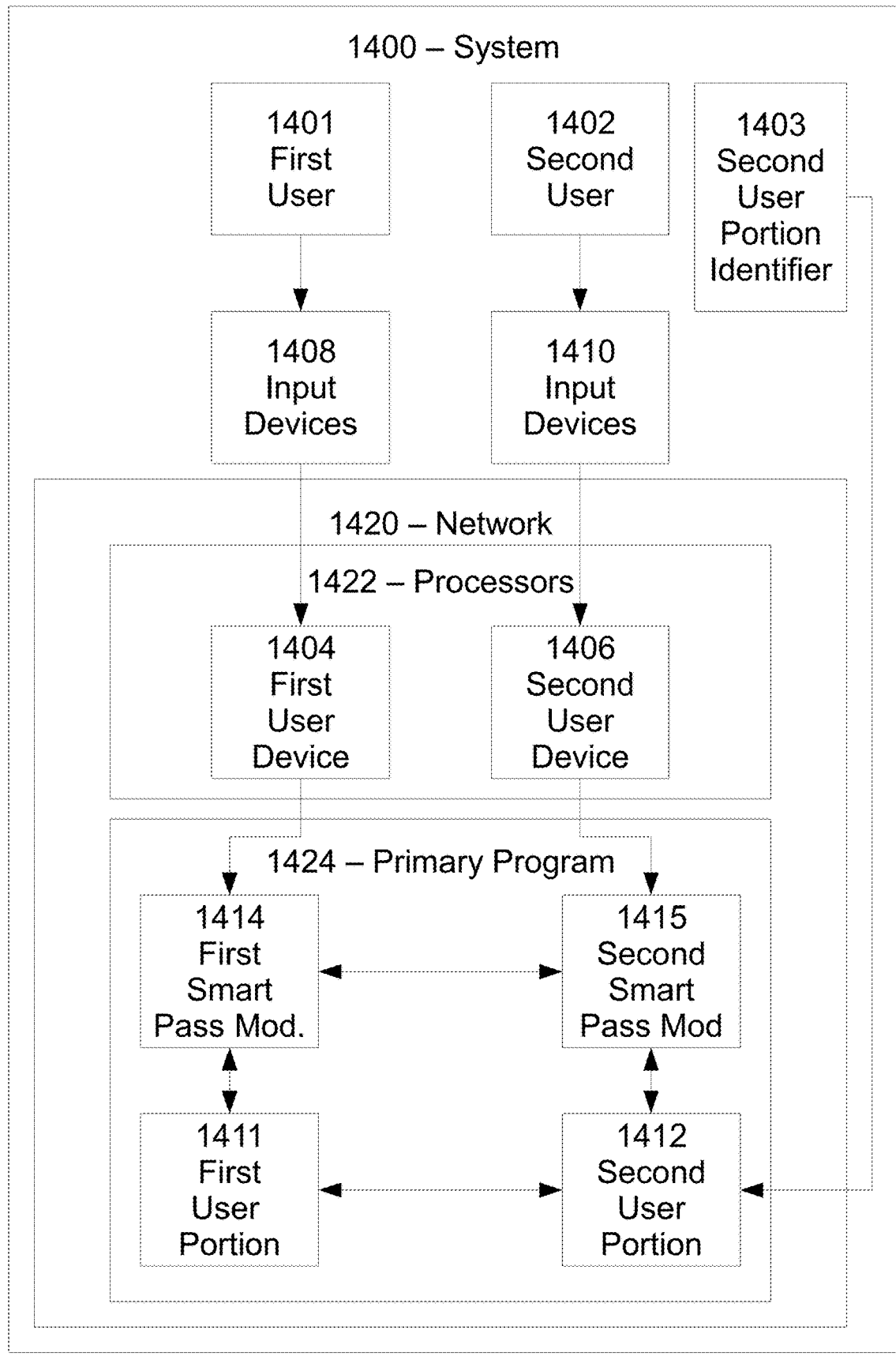
FIG. 14 shows an exemplary system.

As shown in FIG. 14, the system 1400 comprises a first and second user 1401 1402 operating a set of input devices 1408 1410 to control a first and second user device 1404 1406. The user devices comprise a set of processors 1422 which operate over a network 1420 to control a primary program 1424, which may comprise a first and second smart pass module 1414 1415 and a first and second user portion 1411 1423 of the primary program. The first user may identify the second user, and more specifically, the second user portion via a second user portion identifier 1403.

Figure 15:
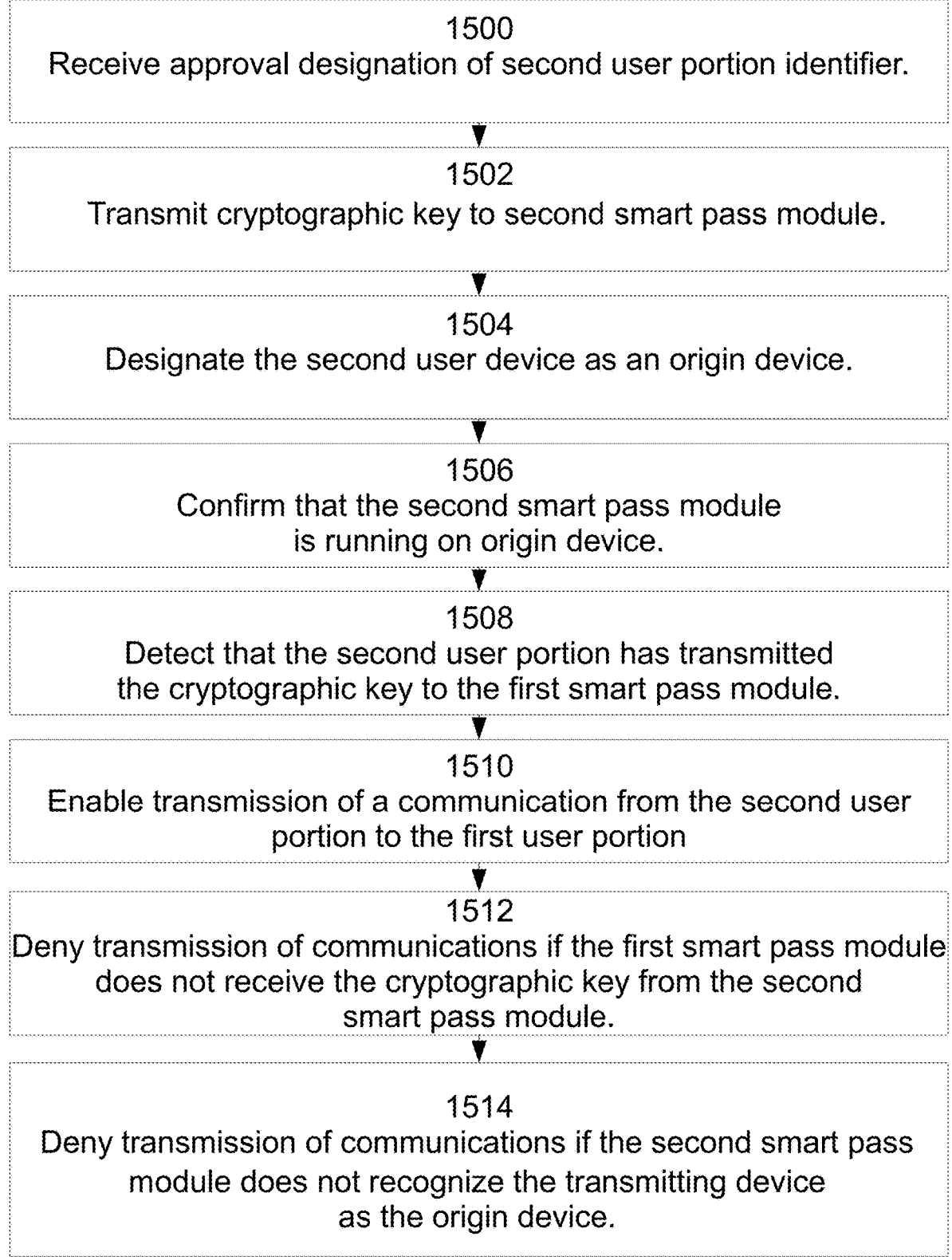
FIG. 15 is a flowchart showing an exemplary system process for enabling transmission of a communication from a second user portion of a primary program to a first user portion.

As shown in FIG. 15, the system may first receive an approval designation by the first user of the second user via a selection or entry of the second user portion identifier 1500. Then, the system may transmit a cryptographic key to the second smart pass module 1502, which in turn may designate the second user device being used to confirm receipt of the cryptographic key as an origin device 1504. The system may, upon confirming that the second smart pas module is running on or being accessed by the origin device 1506, and that the second user portion has transmitted the cryptographic key to the first smart pass module 1508, enable the transmission by the second user via the second user portion of a communication to the first user portion 1510. The system may deny transmission of communications if the first smart pass module does not receive the cryptographic key from the second smart pass module 1512 or if the second smart pass module does not recognize that the transmitting device is the origin device 1514.

The invention claimed is:

1. A system comprising a set of processors, a network, a first user device, a second user device, a primary application, a first smart pass module, and a second smart pass module;
   a. with the primary application being an online program or platform;
   b. with the primary application having a first user portion and a second user portion;
   c. with the first user portion being used by a first user and the second user portion being used by a second user;
   d. with the second user portion having a second user portion identifier and with the second user portion identifier being unique to the second user;
   e. with the first smart pass module configured to transmit a cryptographic key to the second smart pass module upon receiving an approval designation of the second user portion identifier by the first user portion;
   f. with the second smart pass module configured to, upon receiving the cryptographic key from the first smart pass module, designate the second user device as an origin device;
   g. with the first user portion and second user portion configured to:
      i. confirm that the second smart pass module is running on or being accessed by the origin device;
      ii. then detect that the second user portion has transmitted the cryptographic key to the first smart pass module;
      iii. then enable transmission of a communication from the second user portion to the first user portion;
   h. with the first user portion and the second user portion configured to:
      i. deny transmission of the communication from the second user portion to the first user portion if the first smart pass module does not receive the cryptographic key from the second smart pass module;
      i. with the second smart pass module to only transmit the cryptographic key to the first smart pass module when the second smart pass module confirms that the second smart pass module is running on or being accessed by the origin device.

2. The system of claim 1, with instructions to the first smart pass module to transmit the cryptographic key being received from the first user via the first user portion.

3. The system of claim 1, with the primary application being an email application or platform.

4. The system of claim 1, with the first user portion being a user account of the first user on the primary application and the second user portion being a user account of the second user on the primary application.

5. The system of claim 1, with the second user portion identifier being an email address or username.

6. The system of claim 1, with the approval designation of the second user portion identifier by the first user portion being an entry or selection of the second user portion identifier by the first user via the first user portion.

7. The system of claim 1, with the first smart pass module being configured to communicate with the first user portion and the second smart pass module being configured to communicate with the second user portion.

8. The system of claim 1, with the first user portion configured to communicate with the second user portion only via the first and second smart pass modules as intermediaries.

9. A system comprising a set of processors, a network, a first user device, a second user device, a primary application, a first smart pass module, and a second smart pass module;
   a. with the primary application being an online program or platform;
   b. with the primary application having a first user portion and a second user portion;
   c. with the first user portion being used by a first user and the second user portion being used by a second user;

d. with the second user portion having a second user portion identifier and with the second user portion identifier being unique to the second user;
e. with the first smart pass module configured to transmit a cryptographic key to the second smart pass module upon receiving an approval designation of the second user portion identifier by the first user portion;
f. with the approval designation of the second user portion identifier by the first user portion being an entry or selection of the second user portion identifier by the first user via the first user portion;
g. with the second smart pass module configured to, upon receiving the cryptographic key from the first smart pass module, designate the second user device as an origin device;
h. with the first user portion and second user portion configured to:
   i. confirm that the second smart pass module is running on or being accessed by the origin device;
   ii. then detect that the second user portion has transmitted the cryptographic key to the first smart pass module;
   iii. then enable transmission of a communication from the second user portion to the first user portion.

10. The system of claim 9, with the first user portion and the second user portion configured to:
   a. deny transmission of the communication from the second user portion to the first user portion if the first smart pass module does not receive the cryptographic key from the second smart pass module.

11. The system of claim 9, with the second smart pass module to only transmit the cryptographic key to the first smart pass module when the second smart pass module confirms that the second smart pass module is running on or being accessed by the origin device.

12. The system of claim 9, with the primary application being an email application or platform and the second user portion identifier being an email address or username.

13. A system comprising a set of processors, a network, a first user device, a second user device, a primary application, a first smart pass module, and a second smart pass module;
   a. with the primary application being an online program or platform;
   b. with the primary application having a first user portion and a second user portion;
   c. with the first user portion being used by a first user and the second user portion being used by a second user;
   d. with the second user portion having a second user portion identifier and with the second user portion identifier being unique to the second user;
   e. with the first smart pass module configured to transmit a cryptographic key to the second smart pass module upon receiving an approval designation of the second user portion identifier by the first user portion;
   f. with the second smart pass module configured to, upon receiving confirmation of receipt of the cryptographic key by the second user device, designate the second user device as an origin device;
   g. with the first user portion and the second user portion configured to:
      i. deny transmission of a communication from the second user portion to the first user portion if the first smart pass module does not receive the cryptographic key from the second smart pass module.

14. The system of claim 13, with the second smart pass module to only transmit the cryptographic key to the first smart pass module when the second smart pass module confirms that the second smart pass module is running on or being accessed by the origin device.

15. The system of claim 13, with instructions to the first smart pass module to transmit the cryptographic key being received from the first user via the first user portion.

16. The system of claim 13, with the primary application being an email application or platform and the second user portion identifier being an email address.

17. The system of claim 13, with the primary application being a messaging application or platform and the second user portion identifier being a username.

18. The system of claim 13, with the approval designation of the second user portion identifier by the first user portion being an entry or selection of the second user portion identifier by the first user via the first user portion.

19. The system of claim 13, with the first smart pass module being configured to communicate with the first user portion and the second smart pass module being configured to communicate with the second user portion.

20. The system of claim 13, with the first user portion configured to communicate with the second user portion only via the first and second smart pass modules as intermediaries.

* * * * *